United States Patent [19]
Ball et al.

[11] Patent Number: 5,542,791
[45] Date of Patent: Aug. 6, 1996

[54] FRONT-LOADING ROTARY RING CUTTER

[75] Inventors: Robert J. Ball; Martin J. Lakey, both of Plymouth, England

[73] Assignee: The Gleason Works, Rochester, N.Y.

[21] Appl. No.: 362,696

[22] Filed: Dec. 22, 1994

[51] Int. Cl.$^6$ ........................................ B23C 5/06
[52] U.S. Cl. ........................... 407/21; 407/53; 451/548
[58] Field of Search ........................ 407/21, 27, 28, 407/29, 35, 53; 409/232, 234; 451/540, 548

[56] References Cited

U.S. PATENT DOCUMENTS

| | | | |
|---|---|---|---|
| 1,914,411 | 6/1933 | Earl | 407/21 |
| 1,925,528 | 9/1933 | Fickett | 407/28 |
| 2,129,077 | 9/1938 | Wildhaber. | |
| 2,828,672 | 4/1958 | McMullen. | |
| 4,522,538 | 6/1985 | Lindsay | 407/36 |
| 5,137,402 | 8/1992 | Ball et al. | 409/234 |
| 5,197,231 | 3/1993 | Pedersen et al. | |

FOREIGN PATENT DOCUMENTS 381253  5/1978  U.S.S.R. ........................... 407/21

Primary Examiner—M. Rachuba
Assistant Examiner—Kenneth S. Hansen
Attorney, Agent, or Firm—Robert L. McDowell; Ralph E. Harper

[57] ABSTRACT

A front-loading rotary ring cutter for face milling or face hobbing processes wherein the cutter ring is secured to the cutter head by means which eliminate the need to remove the entire cutter assembly from the spindle of a machine tool when changing cutter rings. Preferably the cutter ring includes a radially inward extending base portion through which mounting screws may pass to engage the cutter head for securing the cutter ring to the cutter head. The cutter assembly may also include an adapter plate for attaching the rotary cutter to a machine spindle.

13 Claims, 8 Drawing Sheets

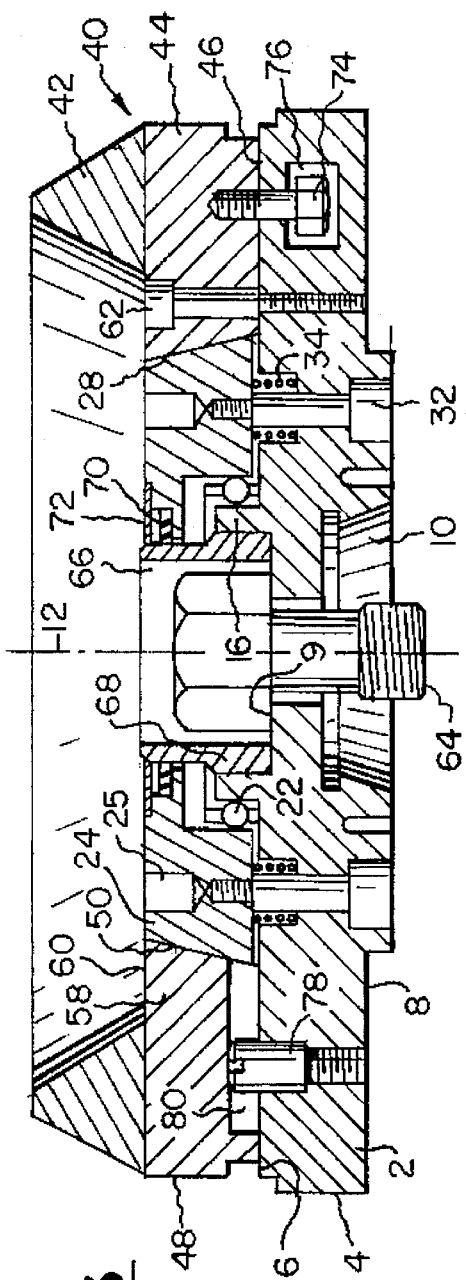
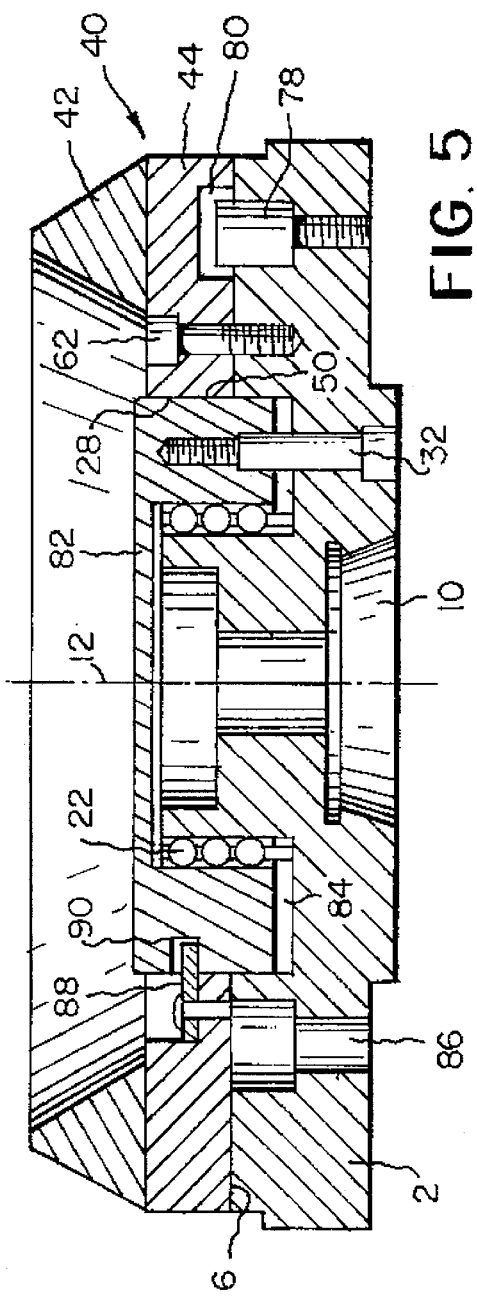

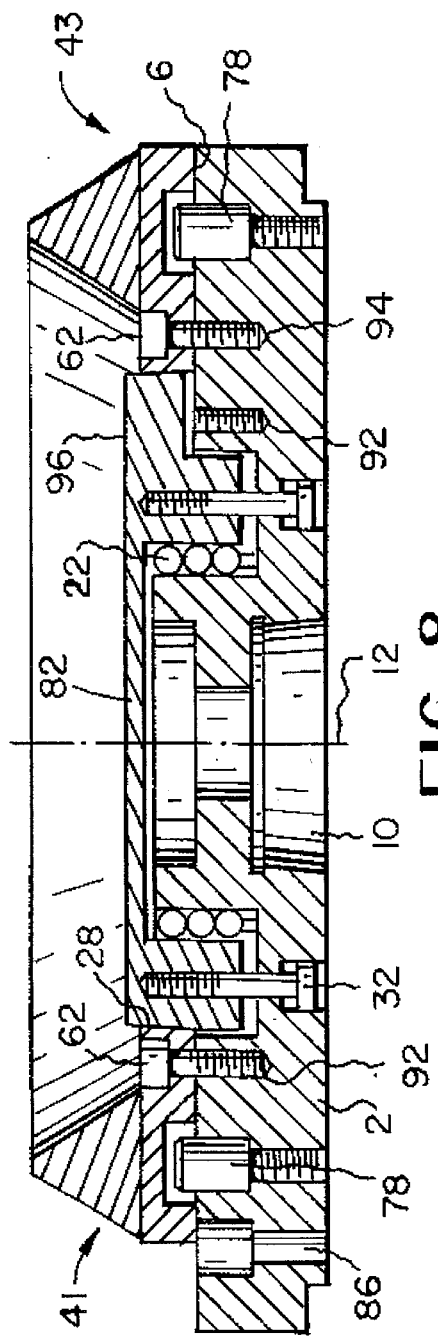
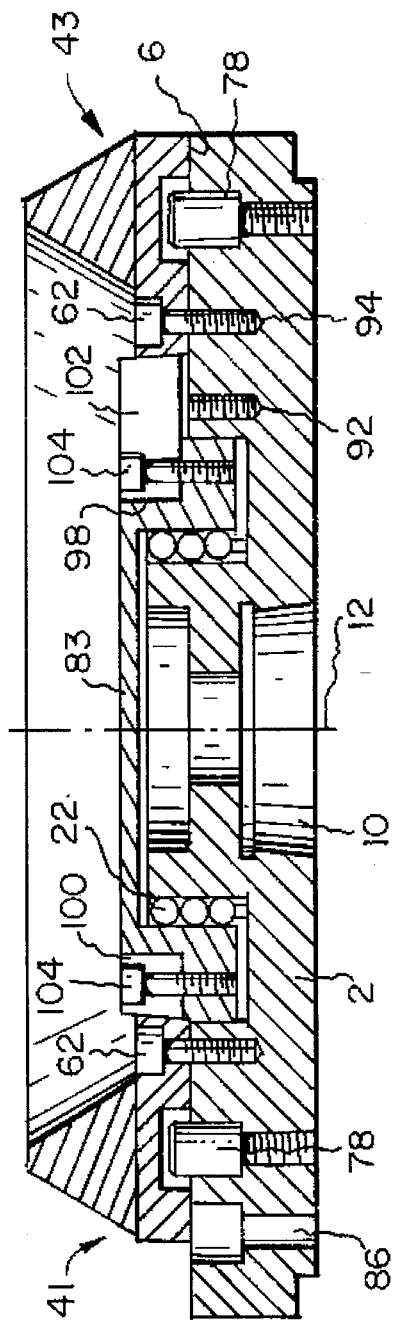

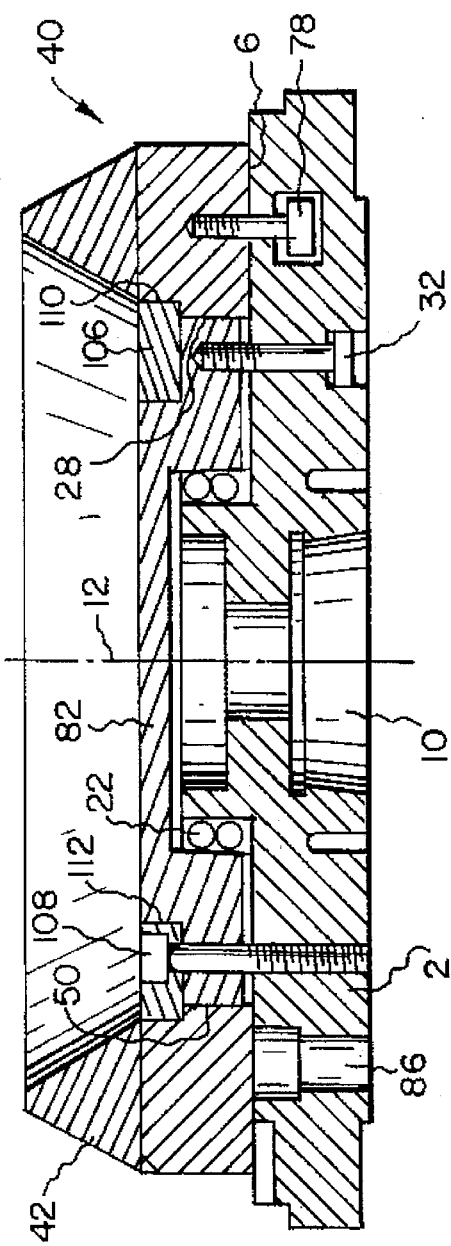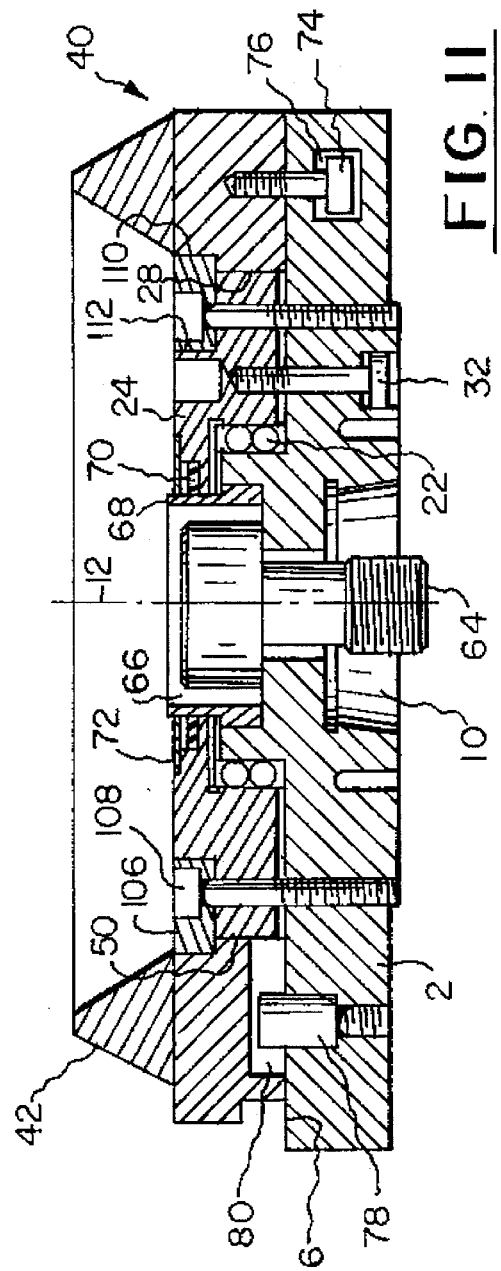

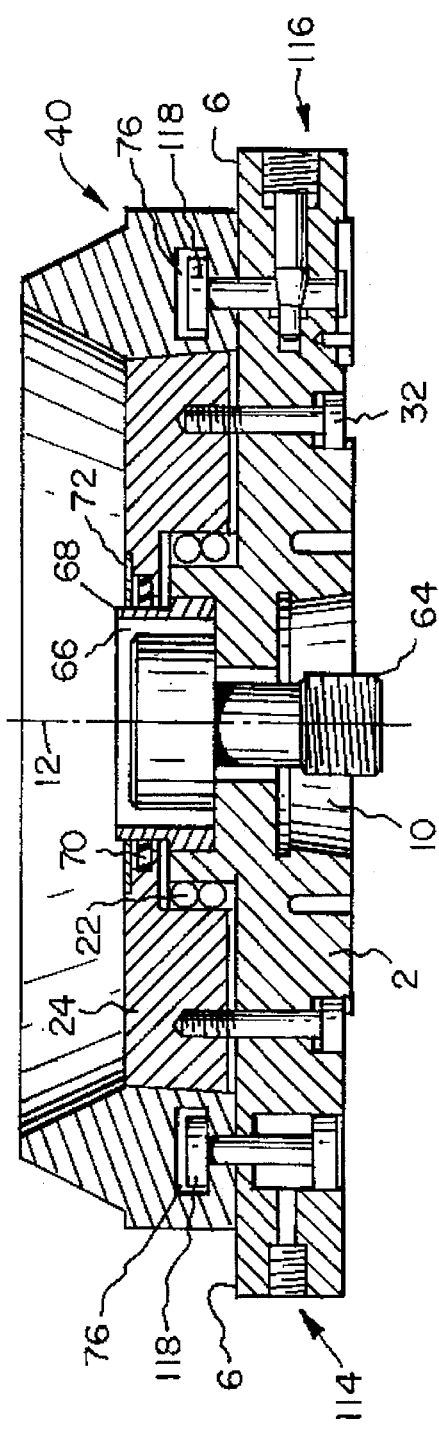
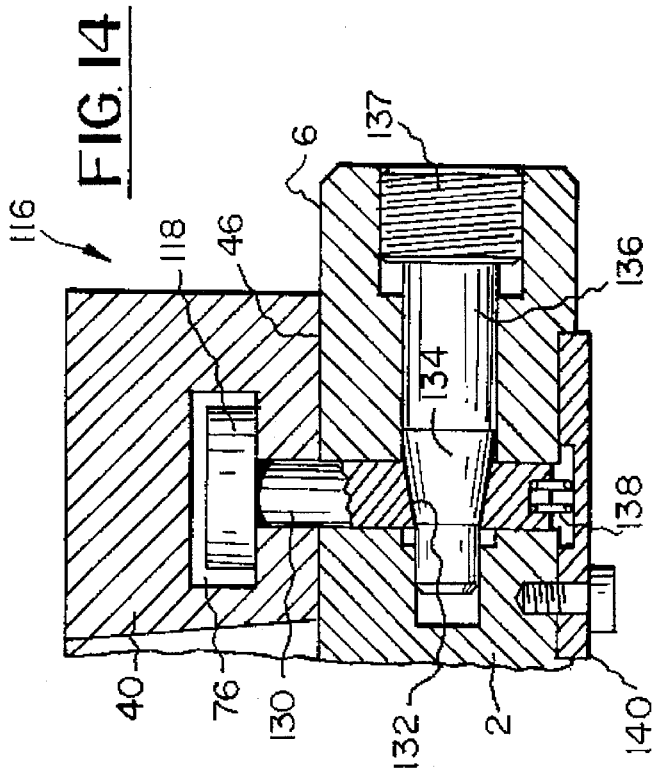
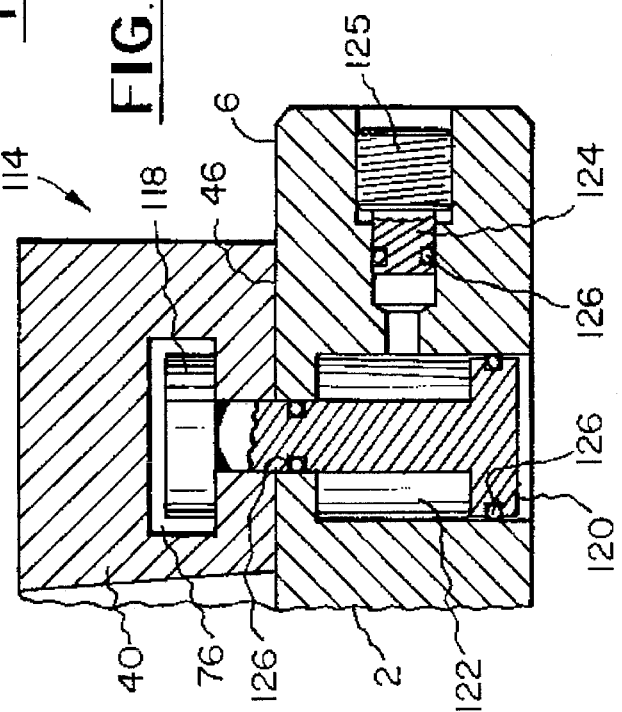

FRONT-LOADING ROTARY RING CUTTER

FIELD OF THE INVENTION

The present invention relates to cutting tools for cutting gears, couplings, and the like by processes such as face milling or face hobbing. Particularly, the present invention is directed to front-loading rotary ring cutters and means to secure the cutter ring to the cutter head.

BACKGROUND OF THE INVENTION

In the production of gears, couplings, and the like, it is known to employ cutting tools of the type referred to as rotary ring cutters. Tools of this type comprise stock removing means located on a ring which is secured to a machine spindle, as shown in U.S. Pat. No. 2,129,077 to Wildhaber, or secured to a cutter head as shown by U.S. Pat. No. 2,828,672 to McMullen. The presence of a ring comprising stock removing means eliminates the need to assemble a cutting tool by positioning individual blades in a cutter head and allows for easy exchange of worn or broken blades or grinding surfaces by simply replacing cutter rings.

With cutter rings it is essential that the ring be centered on the cutter head in order to rotate about the cutter axis with little or no run-out in the radial or axial directions. It is especially important that the cutter is adaptable to variations in ring diameter due to, for example, temperature fluctuations, while maintaining the ring in essentially a run-out free condition.

One manner in which a cutter ring is precisely positioned on a cutter head is shown by U.S. Pat. No. 5,197,231 to Pedersen et al. The cutter head includes a wall surface concentric about an axis of rotation and spaced inwardly of the outer edge of the cutter head. The cutter ring is expanded diametrically to bring its outer surface into contact the wall surface of the cutter head and hence center it on the cutter head. The expansion of the cutter ring is accomplished by a circular disc having a tapered outer edge surface which is urged along the tapered inside surface of the cutter ring to expand the ring. A slit may be included in the ring to facilitate expansion thereof.

In another example, U.S. Pat. No. 5,137,402 to Ball et al. provides a cutter head having a centering disc attached thereto as a means to mount a cutter ring. The centering disc includes a tapered outside edge surface which is complementary with a tapered inside surface of the cutter ring. When the cutter ring is placed on the centering disc, the ring centers itself on the tapered edge surface of the centering disc with the location on the edge surface being dependent of the diameter of the ring. Regardless of ring diameter variations, the cutter ring will center itself on the outer edge surface of the centering disc and thus will rotate true about the cutter axis.

In the preferred embodiment of U.S. Pat. No. 5,137,402, the cutter ring is secured to the cutter head via screws extending from the cutter head into the base of the cutter ring. While there are no performance deficiencies associated with this manner of securing the ring, the arrangement does not lend itself well to quick changing since the entire cutter assembly must be removed from a machine tool and then turned upside-down to access the screws for removing the cutter ring.

It is an object of the present invention to provide means for mounting and securing a cutter ring to a cutter head in a manner whereby the cutter is front-loading. That is, the cutter ring may be loaded onto the cutter head without the need to remove the cutter head from a machine tool.

SUMMARY OF THE INVENTION

The present invention is directed to front-loading rotary cutters for cutting gears, couplings and the like.

The cutters are of the type comprising a disc-shaped cutter head having opposed first and second sides, an axis of rotation, a peripheral surface, and at least one opening therethrough. The cutter also includes a disc-shaped centering disc located on the cutter head with the centering disc having opposed first and second sides and a tapered outer edge surface. The second side of the centering disc being adjacent the first side of the cutter head.

The cutter further comprises a cutter ring having at least one stock removing surface integral with a circular base portion with the base portion including a base surface located adjacent the first side of said cutter head, an outside surface, and a tapered inside ring surface, the tapered outer edge surface of the centering disc abutting against and being complementary with the tapered inside ring surface of the cutter ring whereby the cutter ring is centered on the cutter head thereby enabling the cutter ring to rotate true about the axis of rotation.

The rotary cutter is characterized by the cutter ring base portion including a top surface opposite the base surface and the base portion extending radially inward from the stock removing surfaces to the tapered inside ring surface of the cutter ring. The cutter ring includes a plurality of attachment means extending from the top surface through the inwardly extending base portion and into engagement with said cutter head to secure the cutter ring thereto.

In another embodiment the rotary cutter is characterized by the tapered inside ring surface including an annular shoulder portion proximate the stock removing surfaces. The centering disc includes an annular shoulder portion located in the first surface adjacent the tapered outer edge surface. The annular shoulder portions together forming an annular slot. The slot contains a clamping ring with the clamping ring comprising a plurality of attachment means extending from the clamping ring through the centering disc and into engagement with the cutter head thereby securing the cutter ring to the cutter head.

In a further embodiment, the cutter ring is secured to the cutter head by a clamping means comprising a plurality of headed dowels extending from the first side of the cutter head. The headed dowels are inserted into tee-slots located in the base surface of the cutting ring. The headed dowels are axially movable from a clamped position, for securing the cutter ring to the cutter head, to an open position for disengaging the cutter ring from the cutter head.

In yet another embodiment, at least a portion of the peripheral surface of the cutter head comprises threads and the outside surface of the cutter ring base portion includes a flange having a clamp surface. The cutter ring is secured to the cutter head by a threaded clamping ring which contacts the flange clamp surface and is threadably engaged with the threads on the periphery of the cutter head to secure the cutter ring to the cutter head.

In another embodiment, the tapered inside ring surface includes an annular shoulder portion proximate the stock removing surfaces. The rotary cutter further includes a clamping disc located on the first side of the centering disc with the clamping disc contacting the shoulder portion on the cutter ring. The clamping disc includes a recessed central opening surrounded by a clamping shoulder, the central opening allowing for passage of a machine spindle mounting bolt and the clamping shoulder provides a seating surface for the mounting bolt to mount the rotary cutter to the spindle and secure the cutter ring to the cutter head.

BRIEF DESCRIPTION OF THE DRAWINGS

FIG. 3 illustrates a cross-sectional view of a cutter with a front-loaded cutter ring clamped inwardly of the stock removing surfaces.

FIG. 5 illustrates a cross-sectional view of a preferred cutter with a front-loaded cutter ring clamped inwardly of the stock removing surfaces and having an imperforate centering disc.

FIG. 8 illustrates a front-loading cutter in which the cutter head accommodates centering discs and cutter rings having different diameters.

FIG. 9 shows a front-loading cutter having a centering disc having various width location rings to accommodate cutter rings of different diameters.

FIG. 10 illustrates a front-loading cutter having a clamping ring located in a groove formed by the centering disc and cutter ring.

FIG. 11 illustrates a front-loading cutter having a clamping ring located in a groove formed by the centering disc and cutter ring with the centering disc having a center opening.

FIG. 12 illustrates a front-loading cutter in which the cutter ring is secured to the cutter head by hydraulic or wedge clamping mechanisms.

FIG. 13 is a cross-sectional view of a hydraulic clamping mechanism.

FIG. 14 is a cross-sectional view of a wedge clamping mechanism.

DETAILED DESCRIPTION OF THE PREFERRED EMBODIMENT

The present invention will be discussed with reference to embodiments as illustrated by the accompanying Drawings. In all Drawing figures, like components will be referred to by the same reference numbers. In the context of this specification, the term "cutting" is intended to be of sufficient breadth to include grinding.

Figure 1:
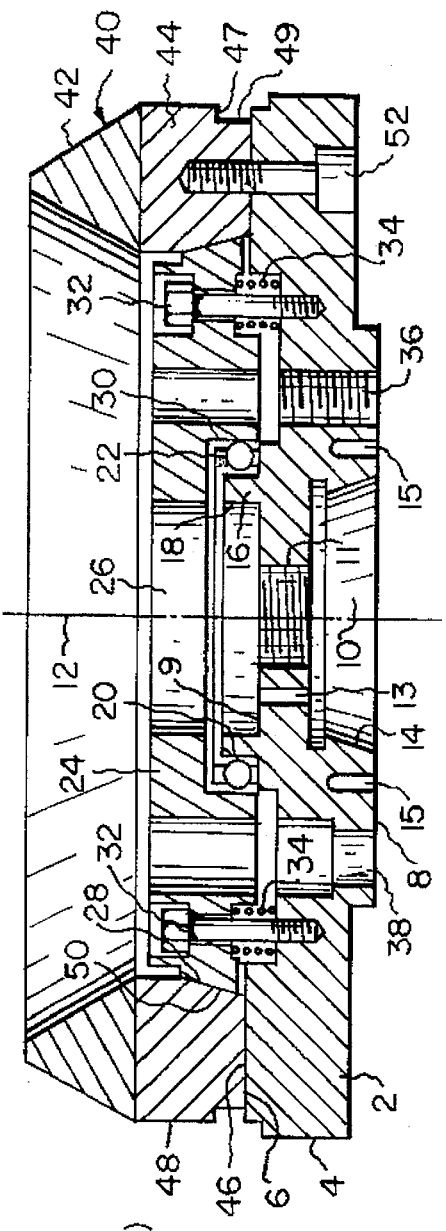
FIGS. 1 and 2 illustrate cross-sectional views of a known prior art ring-type cutter.
Figure 2:
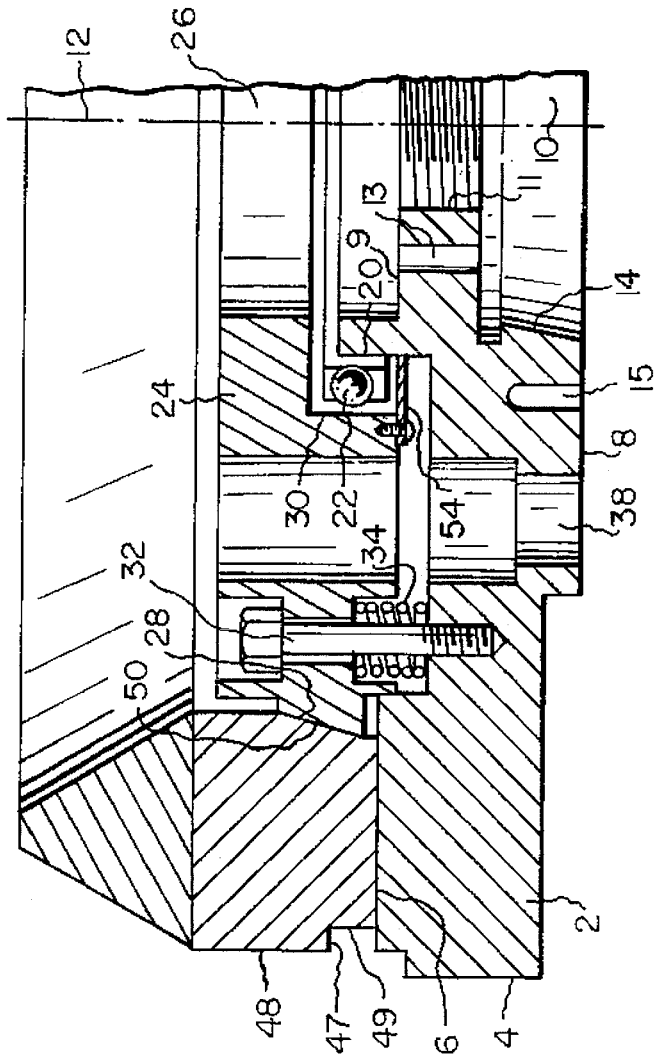

FIGS. 1 and 2 represent a cross-sectional view of a known ring-type cutter as shown in U.S. Pat. No. 5,137,402. The rotary cutter may be utilized in face milling or face hobbing processes for roughing and/or finishing operations and comprises a generally disc-shaped cutter head 2, preferably made of a non-tool steel, having an edge surface 4 and including a first side 6 and a second side 8 with sides 6 and 8 being parallel to one another. The cutter head 2 also comprises a central opening 10 arranged about an axis 12 which is the axis of rotation of the rotary cutter. Central opening 10 may be arranged concentrically with axis 12. The axis 12 coincides with the axis of rotation of a machine tool spindle (not shown) to which the rotary cutter is to be mounted.

In mounting the rotary cutter to a machine tool spindle, the tapered bore 14, which is concentric to axis 12, engages the machine tool spindle nose and the second side 8 abuts against the face of the spindle such that second side 8 is perpendicular to the axis 12. The spindle face may include a key which is inserted into a keyway (not shown) in the surface 8 to assist in the transmittal of torque from the spindle face to the cutter head 2. A bolt (not shown) extends from seating surface 9 through central opening 10 and is threaded into the end of the spindle nose.

Cutter head 2 may include a stress-relieving groove 15 located in the second side 8. Stress-relieving groove 15 is located radially outward from and extends about the tapered bore 14. The groove 15 reduces the stresses associated with securing the cutter head to the machine spindle and in doing so reduces the wear of the tapered bore 14.

The cutter head 2 also includes a projecting portion 16 encircling the opening 10 and axis 12. The projecting portion 16 has an inner surface 18 and an outer surface 20 with at least the outer surface 20 being perpendicular to side 8 and concentric with the axis 12. Extending about projecting portion 16 is a ball and cage arrangement 22 having uniformly sized balls of a predetermined diameter, for example, about one fourth (¼) inch (6.35 mm). Although FIG. 1 shows one row of balls in the ball and cage arrangement 22 it is to be understood that more than one row of balls may be utilized. It should be noted that in place of a ball and cage arrangement 22, bushings may be utilized, or, the outer surface 20 of the cutter head projecting portion 16 and centering disc inner recess wall surface 30 may be precisely formed to fit together. However, a ball and cage arrangement is preferred.

Located adjacent to the first side 6 of cutter head 2 is a generally disc-shaped centering disc 24 which along with the cutter head 2 comprises a mounting assembly for a cutter ring. The disc-shaped centering disc 24, also preferably made of a non-tool steel, comprises a central opening 26 which may be concentric with axis 12, an outer edge surface 28 of which at least a portion is tapered, and a circular recessed region having a circular inner recess wall surface 30. Wall surface 30 and outer edge surface 28 are located concentrically about axis 12.

Surfaces 20, 28, and 30 are precisely manufactured, for example, by grinding, such that placement of the ball and cage arrangement 22 about outer surface 20 followed by placement of circular inner recess wall surface 30 about ball and cage 22 will create an interference fit thereby precisely positioning ball and cage 22 concentric with projecting portion 16 and centering the disc 24 on cutter head 2. Means, such as shoulder screws 32, spaced around centering disc 24 hold, but do not clamp, centering disc 24 and cutter head 2 together.

Located between the centering disc 24 and cutter head 2 are resilient means, such as springs 34, which resiliently urge centering disc 24 spaced away from cutter head 2. Preferably the springs 34 are located at the same locations as shoulder screws 32 with the screws 32 passing therethrough.

Also spaced about the centering disc 24 and extending therethrough as well as through the cutter head 2 is at least two access holes 36 (only one is shown) for placement of an ejector screw (not shown), for removing the rotary cutter from a machine tool spindle. The portion of the access hole 36 which extends through cutter head 2 is tapped in order that the ejector screw may be threaded thereinto. Alternatively, for machines having a narrow spindle face, central opening 10 may include threads 11 for an ejector screw. Also, at least one other access hole 38 may be included for alternative or additional mounting bolts (not shown) for securing the rotary cutter to the spindle of a machine tool.

Secured and centered on cutter head 2 is cutter ring 40. Cutter ring 40 comprises at least one stock removing surface 42, such as a grinding surface made, for example, of aluminum oxide or cubic boron nitride (CBN), or cutting blades made, for example, of high speed steel, powder metal, carbides or ceramics. The stock removing surface 42 may be removably attached to circular base portion 44 made, for example, of high speed steel, or the stock removing surface 42 and circular base portion 44 may be formed as a singular unit such as by milling from a solid piece of metal or by casting.

The base portion 44 includes a base surface 46, outside ring surface 48 and tapered inside ring surface 50. The tapered inside ring surface 50 of cutter ring 40 abuts against and is complementary with the tapered outer edge surface 28 of centering disc 24. The amount of taper of the inside ring surface 50 and the outer edge surface 28 being about two (2) degrees to about twenty (20) degrees. In FIG. 1 tapered inside ring surface 50 is tapered outwardly in a direction toward surface 6 of cutter head 2 and tapered outer edge surface 28 is tapered outwardly in a direction toward surface 6 of cutter head 2.

Surfaces 47 and 49 are known as proof surfaces and extend, respectively, perpendicular and parallel to the axis of rotation 12 of the cutter ring 40. The proof surfaces are precisely formed on the cutter ring and extend completely therearound. These surfaces are used during the manufacture of the cutter ring 40 to ensure that the cutter ring is correctly loaded onto the heads of machines utilized to produce them. Any foreign material, such as dirt, between the cutter ring and the machine head or any damage to the ring will cause run-out in the rotation of the cutter ring, that is, the cutter ring will not rotate true in the radial and/or axial directions about its axis of rotation. Gauges (not shown) contacting proof surfaces 47 and 49 indicate any radial or axial deviations about the axis of rotation which may have occurred during the manufacture of the cutter ring 40. The proof surfaces 47 and 49 may also be used after assembly of the ring cutter or after the ring cutter is mounted to the spindle of a machine tool in order to check for any cutter run-out. As with manufacturing flaws, dirt located between adjacent mounting surfaces or damage to the mounting surfaces during cutter assembly may cause the cutter ring 40 to depart from a correct radial or axial position about the axis of rotation 12.

When cutter ring 40 is placed on centering disc 24, the ring 40 will position itself complementary to the precisely formed, tapered outer edge 28 of centering disc 24 at some location along outer edge 28 depending upon the diameter of the cutter ring 40. A smaller diameter will result in the cutter ring 40 being positioned nearer the top (referenced from cutter head 2 in FIG. 1) of outer edge surface 28 while a larger diameter will result in the cutter ring 40 being positioned nearer to the bottom of outer surface 28. Stated another way, a smaller diameter cutter ring, when centered on centering disc 24, will have a base surface 46 spaced further away from the first side 6 of cutter head 2 than a larger diameter cutter ring which, when centered, will have a base surface located closer to the first side 6 of cutter head 2. It can be clearly seen, therefore, that regardless of the diameter variation of cutter ring 40, the cutter ring will always be centered by centering disc 24 and in turn centered on cutter head 2 thus resulting in true rotation about axis 12.

The resilient means, such as the springs 34, hold the centering disc 24 away from the cutter head 2 thus allowing the cutter ring 40 to find a centered position without interference from the cutter head 2. Once centered by the centering disc 24 on cutter head 2, means, such as at least one screw 52 spaced about the cutter head 2, are utilized to secure the cutter ring 40 to the cutter head 2. The screws 52 extend through the cutter head 2 into the base portion 44 of the cutter ring 40. Wide bores in the cutter head 2 and wide, deep threads in the screws 52 and base portion 44 allow for radial position changes of the cutter ring 40 on the cutter head 2 due to dimensional changes of the cutter ring 40.

Surfaces 6, 8 and 46 are precisely formed, such as by grinding, to be perpendicular to the axis 12 and parallel to the face of a machine tool spindle so that when cutter ring 40 is secured to cutter head 2 by screws 52 and mounted to a machine tool spindle, the rotary cutter will rotate true in the axial plane of a machine tool spindle axis. Since the cutter ring 40 is also centered on the cutter head 2 the rotary cutter will also rotate true in the radial plane of the machine tool spindle axis. Changes in the cutter ring diameter due to temperature variations, such as manufacturing the cutter ring in a cool environment and utilizing it in a hot environment, will be accommodated for by the centering disc 24 thus ensuring precise centering of the cutter ring 40 on the cutter head 2 and true rotation about axis 12.

The rotary cutter of FIG. 1 is assembled by placing the ball and cage arrangement 22 about projecting portion 16. Alternatively, the ball and cage arrangement 22 may be placed in the centering disc 24 next to surface 30. This alternative positioning (See FIG. 2) usually requires at least one retaining means, such as a thin metal strip 54, to be placed on the centering disc 24. FIG. 2 has been enlarged to show detail. The retaining means extends inwardly past the inner recess wall surface 30 in order to retain ball and cage arrangement 22 in contact with wall surface 30 prior to assembly of the rotary cutter. The metal strip 54 may also be in the form of a continuous ring-shaped strip completely encircling and extending inwardly of the inner recess wall portion 30. The centering disc 24 is then placed on the head 2 and held spaced from the head 2 by the screws 32 and springs 34. The cutter ring 40 is then placed on the centering disc 24 and secured to the cutter head 2 by the screws 52. In most cases, when screws 52 are tightened, the rotary cutter must be turned upside down in order to access the heads of the screws 52 on the opposite side of the cutter head 2. Usually, the seating surface 9 of the rotary cutter is placed against the face of a spindle-like device (not shown) that comprises a material, such as rubber, that will not mar the surfaces of the rotary cutter. Projecting from the face of the spindle-like device is a pin (not shown) which is inserted into the hole 13. The presence of the pin in the hole 13 prevents the rotary cutter from rotating as the screws 52 are tightened.

As discussed above, in order to secure the cutter ring to the cutter head when changing cutter rings, the rotary cutter must be removed from a machine tool spindle and turned upside down in order to access the heads of the screws 52 on the opposite side of the cutter head 2. This procedure is time consuming, burdensome, and the repeated mounting/removing of the cutter increases the risk of damage to the machine tool spindle nose.

FIG. 3 illustrates a face milling or face hobbing cutter according to the present invention in which the cutter ring 40 is front-loaded onto the cutter head 2 and centering disc 24. The centering disc 24 is attached to the cutter head 2 by shoulder screws 32 extending from the second side 8 of the cutter head 2 into the centering disc 24. Alternatively, shoulder screws 32 may extend from the outer surface of the centering disc and into the cutter head as is shown in FIG. 1. Holes 25 provide means to attach an extractor (not shown) which may be used to remove the centering disc and cutter head from a machine spindle.

The base portion 44 of the cutter ring 40 extends radially inwardly a predetermined amount from the stock removing surface 42 to the inside ring surface 50. This extended portion 58 has a top surface 60 and includes a plurality of securing means 62 such as screws, spaced, preferably equidistantly, about the top surface 60 of the cutter ring 40. The securing means 62 extend from top surface 60, through the extended portion 58 of base 44 and into engagement with cutter head 2. If desired, as shown by the right side of FIG. 1, the portion of the cutter ring base 44 and cutter head 2 located radially outward of the stock removing surface 42 may be eliminated for material savings.

In the rotary cutter of FIG. 3 the rotary cutter is secured to a machine tool spindle by a center bolt 64 which seats against seating surface 9 of cutter head 2. To allow for passage of the center bolt 64, the centering disc includes a center opening 66. The center opening 66 also comprises a sealing ring 68 located within projecting portion 16 and extending through the opening in the centering disc 24. A swarf seal 70 is present between the sealing ring 68 and centering disc 24 to prevent entry of dirt into the ball and cage arrangement 22 which preferably comprises three rows of balls. A retaining plate 72 is located above the swarf seal 70 to keep the seal 70 in position. Preferably, the retaining plate 72 is secured in position by four counter-sunk screws (not shown).

With the rotary cutter of FIG. 3, the cutter head 2 and centering disc 24 (which together form the mounting assembly) may be placed on a machine spindle and can remain in position when changing cutter rings. Cutter rings may be mounted and removed from the mounting assembly without the need to remove the entire cutter assembly from the spindle as is necessary with the cutter of FIG. 1. By leaving the mounting assembly in place, the machine spindle is protected from damage which may result from mounting and removing the cutter, and the chance of mounting misalignment is reduced since it is not necessary to continually remove the mounting assembly for each changing of a cutter ring. The amount of time required to change cutter rings is greatly reduced since the mounting assembly can remain on the machine tool. Another advantage is that the amount of weight involved in changing cutter rings, and hence the burden to the operator, is significantly reduced since only the ring, and not the entire cutter assembly, need be removed during changing of a cutter ring.

Figure 4:
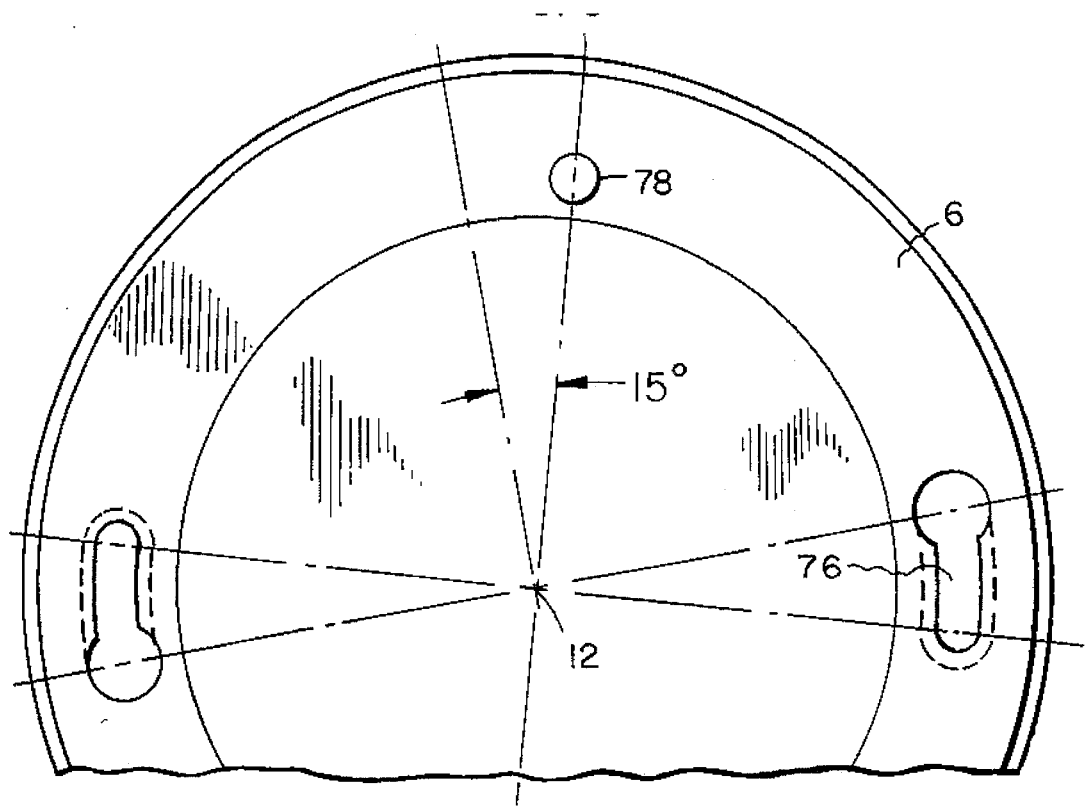
FIG. 4 is a partial view of the surface of the cutter head showing tee-slots and a driving key.

The cutter ring 40 includes a plurality of headed screws or dowels 74 (preferably two) protruding from the bottom surface 46 of the base portion 44. The screws 74 fit into tee-slots 76 formed in the first side 6 of the cutter head 2 by inserting the screws 74 into the slots 76 and rotating either the cutter ring 40 or head 2, preferably about 15 degrees, thereby allowing the cutter ring 40 to be located on the head 2 while the screws 62 are being fitted. Preferably the tee-slots 76, and hence the screws 74, are located 180 degrees apart as shown by FIG. 4. No hand contact is required once the screws 74 have been engaged in the tee-slots 76 of the head 2 and the operator is then free to align and tighten mounting blots 62. Of course it can be seen that the screws 74 could protrude from the head 2 and the tee-slots 76 could be located in the base of the cutter ring 40. The cutter head 2 may also include a driving key 78 protruding from the first side 6. The key 78 fits into slot 80 in the base of the cutter ring 40 to assist in transmitting torque to the cutter ring.

FIG. 5 illustrates a modification of the cutter shown in FIG. 3 and represents a preferred embodiment of the present invention. The centering disc 82 comprises an imperforate outer surface and the first side 6 of the cutter head 2 includes a channel 84 concentric with the axis of rotation 12. The centering disc 82 is positioned in the channel 84 with a portion of the outer edge 28 extending axially outward beyond the first side 6 of the cutter head 2. At least the outwardly extending portion of the outer edge surface 28 is tapered to be complementary with the tapered inside ring surface 50 of the cutter ring 40, the taper preferably being an outward taper when viewed in a direction toward the first side 6 of cutter head 2. The lack of an opening in the outer surface of the centering disc 82 eliminates the need for seals to protect the ball and cage arrangement 22 from the influx of dirt.

The cutter of FIG. 5 is secured to a machine spindle by bolts passing through a plurality of openings 86 arranged on a circle spaced radially from the axis 12. Preferably four equidistantly spaced openings 86 are utilized. It can be seen that in instances where a center bolt is not utilized, it is not necessary to include a hole through the center of the cutter head 2, however, a tapered opening 10 is still required to accept the a machine tool spindle or the tapered necked portion of adapter plate (discussed below).

Since radial openings 86 cannot be accessed with the cutter ring 40 in position, it is first necessary to secure the cutter head 2 and centering disc 82 (which together form the mounting assembly) to the machine spindle. The cutter ring 40 is then placed on the mounting assembly by placing the two or more tabs 88 into slots 90 located in the outer surface of the centering disc 82 and rotating the cutter ring in the slot to loosely position the cutter ring 40 on the cutter head 2. The tabs 88 and slots 90 function in the same manner as screws 74 and tee-slots 76 discussed above in reference to FIG. 3. Once the cutter ring 40 is loosely positioned, the operator is free to align and tighten mounting screws 62 to secure the cutter ring 40 to the cutter head 2.

Figure 6:
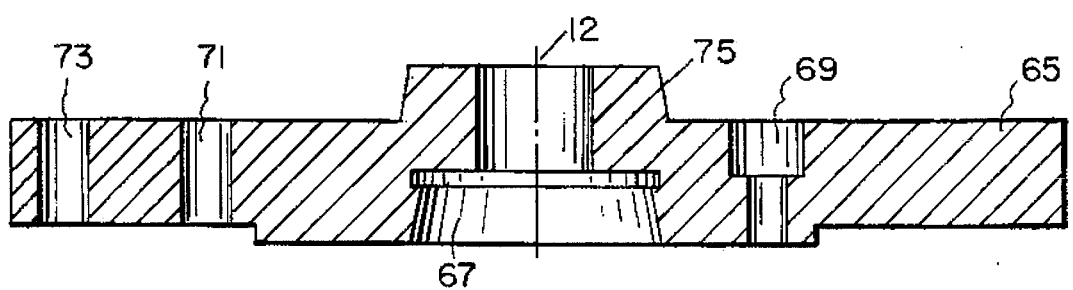
FIG. 6 is a cross-sectional view of an adapter plate for mounting a cutter to a machine spindle.

In some situations a mounting adapter plate may be utilized between the cutter head 2 and the machine spindle. Such an adapter plate 65 is shown in FIG. 6. The adapter plate 65 is used in situations where clamping via a single center bolt through a center opening (for example, 10 in FIG. 5) may not be practical, as in the case where an imperforate centering disc (such as 82 in FIG. 5) is secured from the second side 8 of the cutter head 2, or satisfactory such as in roughing processes where vibration can cause loosening of the center bolt. Adapter plate 65 includes a necked portion 75 for insertion into the tapered center opening 10 of the cutter head 2 and one or more sets of holes such as 71 or 73 arranged on circles of differing radii to accept mounting screws from cutter heads of different diameters. Tapered bore 67 is seated on the machine spindle and the adapter plate 65 is secured to the spindle by bolts passing through a plurality of holes 69 and into engagement with the machine spindle. Preferably, holes 69 are arranged equidistantly about a circle concentric with the axis 12.

Adapter plates enable mounting holes (for example, 86 in FIG. 5) to be located at such a diameter on the cutter head whereby they will not be located under the centering disc 82 which could lead to the introduction of dirt into the ball and cage arrangement 22. When mounting holes 86 are moved radially outward from beneath the centering disc 82 (as in FIG. 5), the diameter on which the holes 86 are then located usually exceeds the diameter of the machine spindle and hence there is nothing for the mounting bolts to engage. Adapter plate 65 provides sets of holes, 71 or 73 for example, to enable mounting of various diameter cutter heads thereto via the radially-outward spaced holes 86 while providing enhanced clamping to the machine spindle by means of bolts through mounting holes 69. With the use of the adapter plate, there is usually no need for a center bolt.

Figure 7:
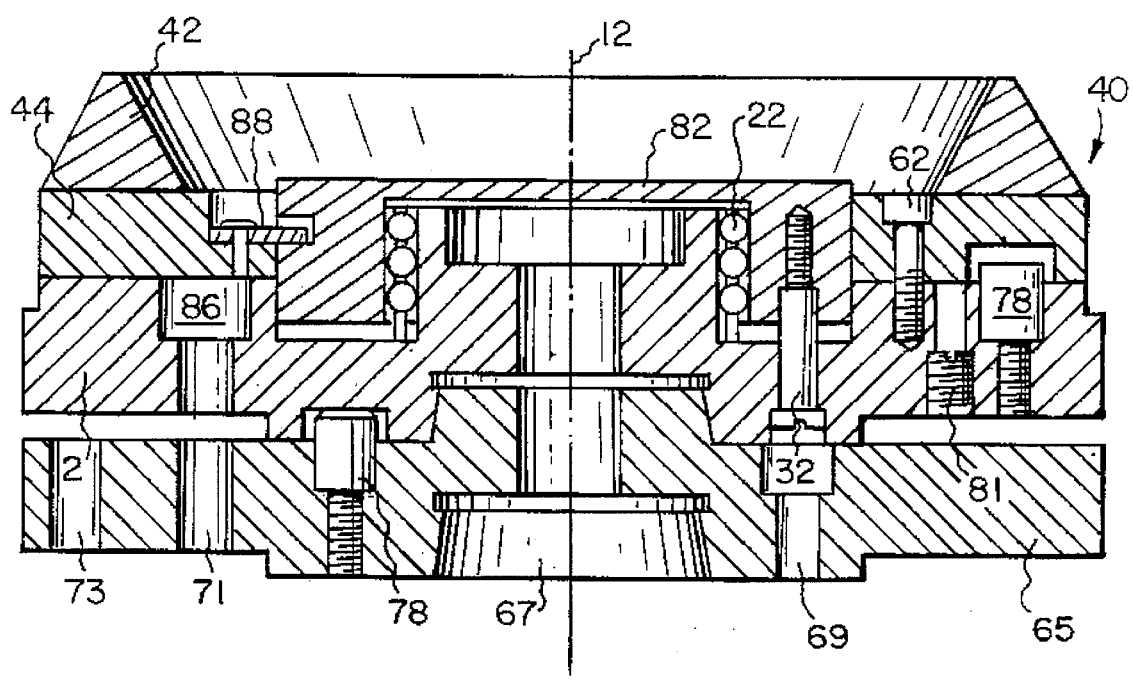
FIG. 7 illustrates the cutter of FIG. 5 mounted to the adapter plate of FIG. 6.

FIG. 7 shows the cutter of FIG. 5 mounted on an adapter plate as shown in FIG. 6. In a manner similar to the cutter head 2, adapter plate 65 may include a driving key 78 to assist in transmitting torque from the machine spindle to the cutter. Cutter head 2 also may include ejector screws 81 to remove the cutter from the adapter plate 65. The adapter plate 65 is mounted to the machine spindle by screws through holes 69 and the mounting assembly (cutter head 2 and centering disc 82) is then mounted to the adapter plate 65 by screws extending through holes 86 and into holes 71 (or 73) in the adapter plate 65. The cutter ring 40 is then mounted to the cutter head 2 by screws 62.

FIG. 8 illustrates a variation of FIG. 5 wherein the cutter head 2 is of a diameter sufficient to accommodate different diameter cutter rings. While the present invention contemplates a cutter head to accommodate two or more different diameter cutter rings, in the embodiment of FIG. 5, cutter head 2 comprises two sets of threaded holes 92 and 94 to accommodate two different diameter cutter rings 41 and 43 (such as, for example, 7.5 inch (190.5 mm) and 9 inch (228.6 mm) diameter cutters). For comparison and explanation purposes only, different diameter cutter rings 41 and 43 are shown on the same cutter head 2.

In FIG. 8, cutter head 2 is mounted to a machine spindle via bolts passing through radially spaced openings 86 and into an adapter plate as shown in FIGS. 6 and 7 and discussed above.

The left portion of FIG. 8 illustrates a cutter ring 41 of a particular diameter (such as 7.5 inches (190.5 mm) for example) while the right side of FIG. 8 shows a cutter ring 43 having a larger diameter (9 inches (228.6 mm) for example). It can be seen that the smaller diameter cutter mounts to the cutter head 2 via screws 62 engaged in the inner set of holes 92 and it can also be seen that the cutter head 2 extends radially outward beyond the cutter head 41 to provide support for larger diameter cutter rings. With the cutter ring 41, a centering disc similar to that of FIG. 5 is necessary. Of course since holes 86 are spaced outward from beneath the centering disc 82, an adapter plate (FIG. 6) would be necessary to mount the cutter to a machine spindle.

However, the larger diameter cutter ring 43 exemplified by the right portion of FIG. 8 is mounted to the cutter head 2 via mounting screws 62 engaging the outer set of holes 94 in the cutter head 2. It can be seen that with the larger diameter cutter ring 43, the diameter of the centering disc 82 must be increased to accommodate the larger diameter of the cutter ring 43. This is accomplished by radially extending the portion of the centering disc 82 projecting beyond the first side 6 of the cutter head 2 in a direction along the first side 6 of the cutter head 2. This portion is shown by 96 in FIG. 8 and terminates with a tapered outer edge surface complementary with the tapered inside ring surface of cutter ring 43.

FIG. 9 is similar to FIG. 8 except that instead of providing centering discs of different diameters to accommodate varying diameter cutter rings, a single-size centering disc 83 is provided. The centering disc 83 includes a shoulder portion 98 into which fits location rings of various widths (100, 102, for example) to center cutter rings 41 or 43 on cutter head 2. The location discs are secured in shoulder 98 by mounting screws 104. The width of location ring 100 is the same as the width of the shoulder 98 and extends to the outer edge of the centering disc 83. The width of location ring 102 is wider than shoulder 98 and extends radially outward beyond the edge of the centering disc 83 along the first side 6 of the cutter head 2.

FIG. 10 illustrates another embodiment wherein the cutter ring 40 is secured to the cutter head 2 by a clamping ring 106 and screws 108 extending through the centering disc 82 and into the cutter head 2. The clamping ring 106 is positioned in a slot formed by an annular shoulder 110, formed on the tapered inside ring surface 50 proximate the stock removing surfaces 42, and an annular shoulder 112 formed in the tapered outer edge surface 28 at the outer side of the centering disc 82. Changing a cutter ring 40 only requires removal of the clamping ring 106.

FIG. 11 is similar to the cutter of FIG. 10 except the cutter is mounted to a machine tool spindle by a center bolt 64 in the same manner as shown in FIG. 3. The centering disc 24 comprises an annular shoulder 112 and the cutter ring 40 comprises an annular shoulder 110 with the shoulders 110 and 112 forming an annular slot into which clamping ring 106 is positioned and secured by screws 108.

FIG. 12 illustrates another embodiment of a front-loading rotary cutter according to the present invention in which the cutter ring 40 is secured to the cutter head 2 by a plurality, preferably three, of headed dowels 118 equidistantly spaced and protruding from the first side 6 of cutter head 2. The headed dowels 118 are positioned in similarly spaced tee-slots 76 (as shown in FIG. 3) located about the base surface 46 of the cutter ring 40. The headed dowels 118 are axially movable by an actuating means such as hydraulic clamping means 114 or wedge clamping means 116 both of which have been shown on the same cutter in FIG. 12 for discussion and comparison purposes only. While the above arrangement is preferred, it can be seen that the headed dowels 118 may be located protruding from the base surface 46 of the cutter ring 40 and the tee-slots 76 may be located in the first side 6 of cutter head 2.

FIG. 13 shows an enlarged view of hydraulic clamping means 114 in which headed dowel 118 is urged toward cutter head 2 to clamp cutter ring 40 to the cutter head 2 by increasing the amount of hydraulic fluid in chamber 122. Hydraulic fluid is introduced into chamber 122 by inward movement of plunger 124 to increase pressure on bottom plate 120 thereby causing headed dowel 118 to engage and clamp cutter ring 40 to cutter head 2. Seals 126, such as O-rings, prevent hydraulic fluid from leaking from the chamber 122. To release the headed dowel 118 from clamping, plunger 124 is moved in an outward direction to relieve the pressure in chamber 122. Preferably, the head 125 of plunger 124 is in threaded engagement with the cutter head 2 and therefore only requires turning with a wrench-like tool (not shown) to move it inward or outward.

Wedge clamping mechanism 116, as shown in FIG. 14, functions in a similar manner in that the headed dowel 118 moves toward cutter head 2 in order to clamp the cutter ring 40 to the cutter head 2. The shaft 130 of the headed dowel 118 includes a tapered opening 132 into which fits the tapered shaft portion 134 of actuator rod 136. As the actuator rod 136 is moved in an inward direction, a wedging action takes place as the tapered shaft portion 134 positions itself in the tapered opening 132 to cause the headed dowel to move toward cutter head 2 to clamp the cutter ring 40 to the cutter head 2. When the actuator rod 136 is moved in an outward direction, the force of spring 138, held in place by retaining strip 140, urges the headed dowel away from the cutter head 2 thus releasing the cutter ring 40. Preferably, the head 137 of actuator rod 136 is in threaded engagement with the cutter head 2 and therefore only requires turning with a wrench-like tool (not shown) to move it inward or outward.

Figure 15:
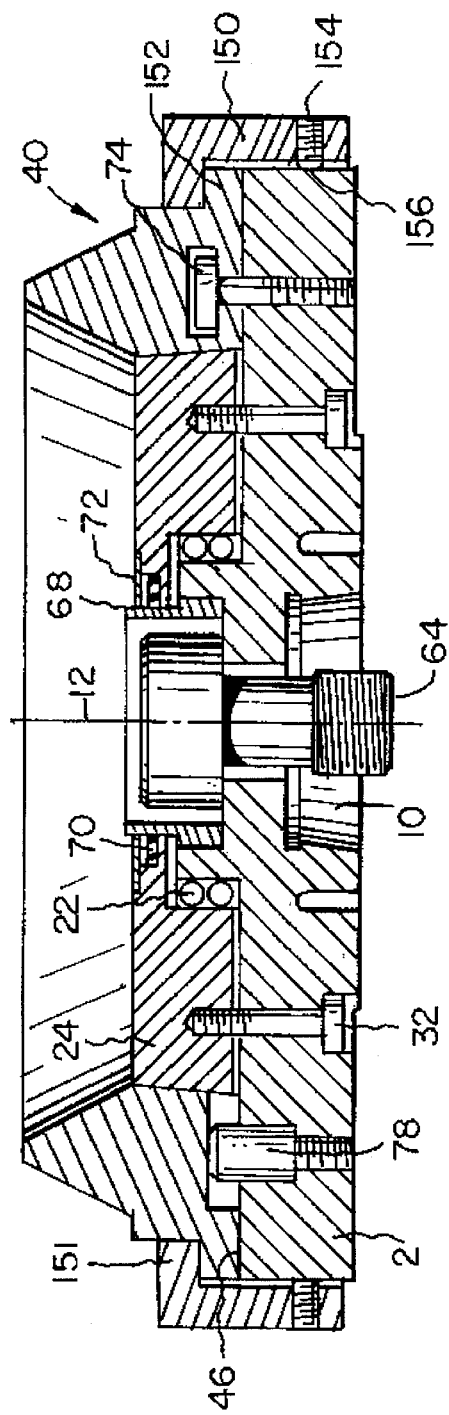
FIG. 15 illustrates a front-loading cutter in which the cutter ring is secured to the cutter head by a peripheral threaded clamping ring.

FIG. 15 illustrates another embodiment of a front-loading cutter in which the cutter ring 40 is secured to the cutter head 2 by a inside-threaded clamping ring 150 having a radially inward extending clamping portion 151. The outer peripheral surface of the cutter ring 40 adjacent the base surface 46 includes a flange portion 152 and the outer peripheral surface of the cutter head 2 comprises threads. The threaded clamping ring 150 is engaged with the threaded outer surface of the cutter head 2. As the clamping ring 150 moves along the outer surface of cutter head 2, contact occurs between the clamping portion 151 and the flange portion 152 along a clamping interface essentially parallel to base surface 46 to secure the cutter ring 40 to the cutter head 2. Clamping ring 150 also includes a secondary clamp 154, such as a small screw, which is advanced into a shallow groove 156 in the outer surface of cutter head 2 to hold the clamping ring 150 in position once the cutter ring 40 is secured.

While the clamping interface between clamping portion 151 and flange portion 152 preferably extends parallel to base surface 46, the inner surface of clamping portion 151 and the outer surface of flange 152 may comprise complementary angled surfaces such that the clamping interface is oriented at a like angle to base surface 46.

Figure 16:
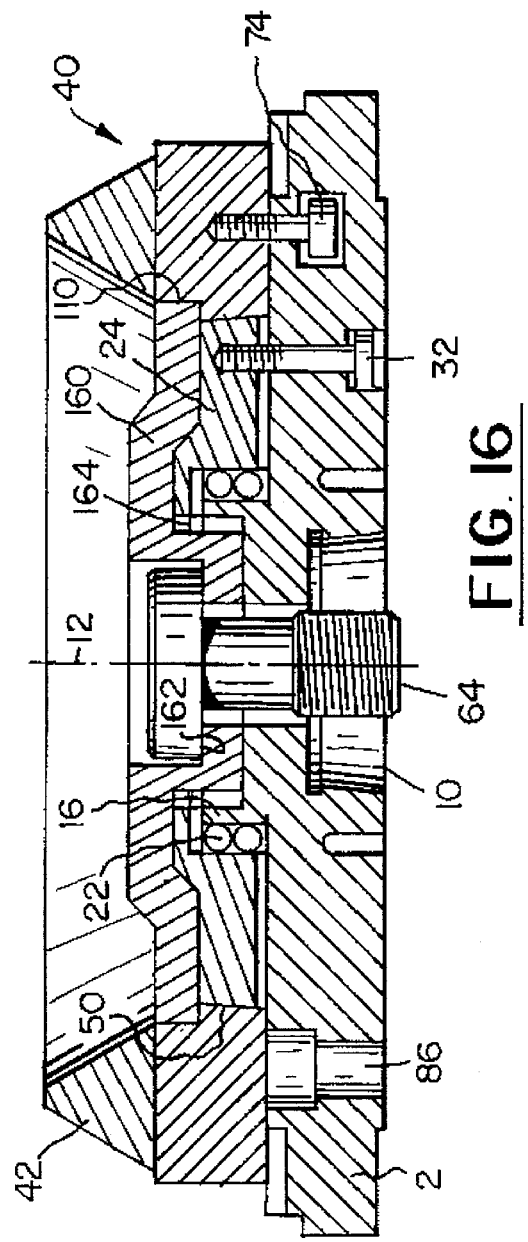
FIG. 16 shows a front-loading cutter in which the cutter ring is secured to the cutter head by a clamping disc.

FIG. 16 shows a front-loading cutter comprising a clamping disc 160 which is held in place by center bolt 64. The clamping disc 160 includes a central opening, to allow for passage of center bolt 64, and a recessed clamping shoulder 162 against which center bolt 64 seats when mounting the cutter to a machine tool spindle. Upon tightening of the center bolt 64, the peripheral portion of the clamping disc 160 contacts an annular shoulder portion 110 in the tapered inside ring surface 50 of cutter ring 40 proximate stock removing surfaces 42 to secure the cutter ring 40 to the cutter head 2. If desired, sealing means such as a sealing ring can be placed in the region 164 between the clamping disc 160 and the cutter head projecting portion 16 to prevent dirt from entering the ball and cage arrangement 22 when the clamping disc 160 is removed.

It is to be understood that although some embodiments of the present invention have been illustrated by showing only one of imperforate centering discs (such as FIG. 8) and centering discs comprising a central opening (such as FIG. 12), the invention is not to be limited to the specific centering disc shown. Instead, the front-loading cutters of the present invention should be seen to include either the centering disc having a central opening for the passage of a center bolts or the imperforate centering disc.

The embodiments of the present invention allow for front-loading of cutter rings onto cutter heads without the need to remove the entire cutter assembly from the spindle of a machine tool thus resulting in a saving of time to change cutter rings, a reduction of spindle wear, and a lesser burden for the machine operator.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutter ring for mounting on a cutter head and centering disc of a rotary ring cutter, said cutter ring comprising at least one stock removing surface integral with a circular base portion, said base portion having a base surface, an outside surface, and a tapered inside ring surface, said tapered inside ring surface of said cutter ring being positionable against and complementary with a tapered outer edge surface of said centering disc whereby said cutter ring is centered on said cutter head thereby enabling said cutter ring to rotate true about an axis of rotation, the improvement comprising:

said cutter ring base portion extends radially inward from said at least one stock removing surface to said tapered inside ring surface, the inward extending base portion including a top surface opposite said base surface, said cutter ring including a plurality of spaced holes extending from said top surface through said inwardly extending base portion for passage of attachment means to secure said cutter ring to said cutter head.

2. The cutter ring of claim 1 further comprising means to position said cutter ring adjacent to said cutter head prior to securing said cutter ring to said cutter head, said position means comprising at least one headed dowel located in said base surface or at least one receiving tee-slot located in said base surface.

3. A rotary cutter said cutter comprising:

a generally disc-shaped cutter head, said cutter head having an axis of rotation, a peripheral surface, and opposed first and second sides, said first side including a projecting portion encircling said axis, said projecting portion having an inner surface and an outer surface with at least said outer surface being concentric with said axis, a generally disc-shaped centering disc located on said cutter head, said centering disc having opposed first and second sides with said second side being adjacent said first side of said cutter head, said centering disc having an outer edge surface with at least a portion of said edge surface being tapered, said centering disc having a circular recessed region comprising a circular inner recess wall surface with said circular inner recess wall surface located about said projecting portion and concentric with said axis, a cutter ring comprising at least one stock removing surface integral with a circular base portion, said base portion having a base surface located adjacent said first side of said cutter head, an outside surface, and a tapered inside ring surface, said tapered outer edge surface of said centering disc abutting against and complementary with said tapered inside ring surface of said cutter ring whereby said cutter ring is centered on said cutter head thereby enabling said cutter ring to rotate true about said axis, characterized in that:

said cutter ring base portion extends radially inward from said at least one stock removing surface to said tapered inside ring surface, the inward extending base portion including a top surface opposite said base surface, said cutter ring including a plurality of attachment means extending from said top surface through said inwardly extending base portion and into engagement with said cutter head.

4. The rotary cutter of claim 3 wherein said centering disc further includes:
   an annular shoulder in the outer edge adjacent said first side, and,
   a location ring secured in said annular shoulder, said location ring having a predetermined width and having a tapered outer surface abutting against and complementary with said tapered inside ring surface of said cutter ring.

5. The rotary cutter of claim 4 wherein said predetermined width is essentially equal to the width of said annular shoulder.

6. The rotary cutter of claim 4 wherein said predetermined width is greater than the width of said annular shoulder.

7. The rotary cutter of claim 3 wherein said cutter head includes a channel in said first side, said channel encircling said projecting portion, said centering disc being positioned in said channel with a portion of said outer edge surface extending axially beyond said first side of said cutter head, the outer surface of said portion being tapered.

8. The rotary cutter of claim 7 wherein said outer edge surface portion also extends a predetermined amount radially along said first side of said cutter head.

9. The rotary cutter of claim 3 further including an adapter plate secured to said second side of said cutter head.

10. The rotary cutter of claim 9 wherein said adapter plate comprises a plurality of holes for accepting mounting screws from said cutter head, said holes being located radially outward from the location of said centering disc.

11. The rotary cutter of claim 3 wherein said rotary cutter includes a central opening in said cutter head and said centering disc, said rotary cutter further comprising a sleeve bushing with said bushing located within said projecting portion on said cutter head and about said central opening and wherein said sleeve bushing extends through said opening in said disc-shaped centering disc.

12. The rotary cutter of claim 11 further including a sealing means located between said sleeve bushing and said centering disc.

13. The rotary cutter of claim 1 further comprising means to position said cutter ring adjacent to said cutter head prior to securing said cutter ring to said cutter head, said position means comprising at least one headed dowel located in one of said first side and said base surface and at least one receiving tee-slot located in the other of said first side and said base surface.

* * * * *